United States Patent
Zhang et al.

(10) Patent No.: US 8,712,026 B1
(45) Date of Patent: Apr. 29, 2014

(54) METHOD AND SYSTEM FOR DISTRIBUTING RINGBACK FILES

(75) Inventors: Baoquan Zhang, Overland Park, KS (US); Sharon M. Johnson, Overland Park, KS (US); Stephen A. Smith, Parkville, MO (US); Jason Shaw, Olathe, KS (US); Roderick Polk, Round Hill, VA (US); Anthony J. Wageman, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 935 days.

(21) Appl. No.: 12/258,947

(22) Filed: Oct. 27, 2008

(51) Int. Cl.
*H04M 3/42* (2006.01)

(52) U.S. Cl.
USPC .................. 379/207.16; 379/373.02

(58) Field of Classification Search
USPC ............. 379/201.01–207.16; 455/401, 414.1, 455/567
See application file for complete search history.

(56) References Cited

U.S. PATENT DOCUMENTS

| | | | |
|---|---|---|---|
| 6,801,521 B1 | 10/2004 | Shaffer et al. | |
| 7,010,112 B2 * | 3/2006 | Lee et al. | 379/207.16 |
| 7,602,901 B1 | 10/2009 | Kates et al. | |
| 2004/0120494 A1 | 6/2004 | Jiang et al. | |
| 2004/0223605 A1 | 11/2004 | Donnelly | |
| 2005/0079861 A1 | 4/2005 | Lim | |
| 2006/0245571 A1 | 11/2006 | Radziewicz et al. | |
| 2006/0291638 A1 | 12/2006 | Radziewicz et al. | |
| 2007/0116253 A1 | 5/2007 | Batni et al. | |
| 2007/0121657 A1 | 5/2007 | Boillot et al. | |
| 2007/0127642 A1 | 6/2007 | Bae et al. | |
| 2007/0127663 A1 | 6/2007 | Bae et al. | |
| 2007/0190983 A1 | 8/2007 | Goldfarb et al. | |
| 2007/0206736 A1 | 9/2007 | Sprigg et al. | |
| 2007/0211872 A1 | 9/2007 | Cai et al. | |
| 2007/0263798 A1 | 11/2007 | Dewing et al. | |
| 2008/0045209 A1 * | 2/2008 | Mo et al. | 455/433 |
| 2008/0057902 A1 | 3/2008 | Sidon | |
| 2009/0119164 A1 | 5/2009 | Colson et al. | |
| 2009/0185665 A1 * | 7/2009 | Chen | 379/29.01 |
| 2009/0319585 A1 * | 12/2009 | Gokhale | 707/205 |

(Continued)

FOREIGN PATENT DOCUMENTS

WO 01/41411 6/2001

OTHER PUBLICATIONS

U.S. Appl. No. 12/258,947, specification pp. 2-3 (background), Method and System for Distributing Ringback Files, Baoquan Zhang.*

U.S. Appl. No. 12/258,947, specification pp. 2-3 (background). Method and System for Distrubting Ringback Files, Baoquan Zhang.*

(Continued)

*Primary Examiner* — Duc Nguyen
*Assistant Examiner* — Assad Mohammed

(57) ABSTRACT

Methods and systems for facilitating distribution of ringback files to caller devices are provided. A ringback file server may receive a request to associate a ringback file with a callee device and a caller device. Responsively, the ringback file server transmits a copy of the ringback file to the caller device, thus enabling the caller device to play out the ringback file when the caller device subsequently initiates a call to the callee device. Preferably, the ringback file is a high quality audio or video file. Thus, locally storing the ringback file at the caller device facilitates playout of high quality ringback media and also avoids requiring that the ringback file server stream ringback media in-band to the caller device.

20 Claims, 8 Drawing Sheets

(56) References Cited

U.S. PATENT DOCUMENTS

| | | |
|---|---|---|
| 2010/0005059 A1 | 1/2010 | Banerjee et al. |
| 2010/0046732 A1 | 2/2010 | James et al. |
| 2010/0098223 A1* | 4/2010 | Zampiello ............ 379/87 |
| 2010/0202604 A1 | 8/2010 | Siegel |
| 2010/0254372 A1 | 10/2010 | Keller et al. |

OTHER PUBLICATIONS

Office Action for U.S. Appl. No. 12/554,227 mailed Apr. 25, 2012, 27 pages.

Final Office Action for U.S. Appl. No. 12/554,227 mailed Nov. 9, 2012, 31 pages.

* cited by examiner

METHOD AND SYSTEM FOR DISTRIBUTING RINGBACK FILES

BACKGROUND

In traditional circuit-switched telephony, such as the public switched telephone network (PSTN), ringback is an audible signal or tone, usually mimicking the sound of a phone ringing. Typically, ringback is heard by a caller after the caller dials a callee, but before the callee answers the call. Ringback is meant to indicate progress to the caller, even though the ringback tone may not be synchronized with a ringing, or any other indication, that is presented to the callee.

In recent years, personalized ringback has become popular. This feature allows a PSTN subscriber to specify an audio selection for ringback, so that anyone calling the subscriber will hear the audio selection rather than the default ringback. Furthermore, the PSTN subscriber may choose to specify that different audio selections be played to different potential callers. These audio selections can take any form, but are usually based on audio clips or files of content such as popular music, speeches, or sound effects.

Personal ringback tones can be applied to both wireline communication devices, such as desktop phones, and wireless communication devices, such as cell phones. Regardless of the type of device, in these traditional systems, the ringback tone is generated by the network and then streamed or otherwise transmitted in-band to the caller's device at the time of call setup.

The PSTN was designed to efficiently transport voice signals. Most of the spectral energy in a human voice signal occurs below 4000 Hz, so PSTN equipment typically filters all input signals above 4000 Hz. But, the human ear can perceive audio signals of up to 20,000 Hz. Therefore, PSTN filtering may produce an audio signal that exhibits a lower quality than the same audio signal prior to being subjected to filtering. For example, some people sound differently over the PSTN than they do in person because a portion of the energy in their voice signal is not present for listeners to perceive.

Additionally, the use of Internet telephony, such as voice over Internet Protocol (VoIP) may further impair the quality of voice signals. VoIP codecs are designed to compress voice signals into low-bitrate streams. For example, the International Telecommunications Union (ITU) G.723.1 codec may compress an input signal of 64 Kbps to an output signal of less than 8 Kbps. In order to do so, these codecs may utilize psychoacoustic models that reduce or eliminate spectral components from input signals that are less likely to be produced by a human vocal tract and less likely to be audible to human hearing. In the process of doing so, these codecs potentially discard even more spectral energy from the input signal than PSTN filtering.

As a result of this lossy PSTN filtering and VoIP compression, audio signals played out subject to one or both of these procedures may exhibit a lower perceived quality than the same audio signals without being subjected to filtering or compression. Furthermore, audio signals of music tend to have more spectral energy above 4000 Hz than audio signals of voice, and, when compressed by a voice codec, result in poor quality. So, even if a high-quality audio file is chosen to be personalized ringback, if it is transmitted in-band over the PSTN or a VoIP bearer, the caller will likely notice that the resulting audio signal is actually of very low quality.

OVERVIEW

When personalized ringback was initially deployed, desktop phones and cell phones had relatively little memory, little processing power, and low-speed network connections. Thus, it was not an option to transmit high-quality ringback tones, in the form of audio files, to these devices for storage or playout. Even if the devices could receive and store such audio files, they would not have had the processing power or program logic to play out the audio files.

A traditional ringback server allows a callee to specify ringback media that is played out to a caller who calls the callee. To facilitate this functionality, the ringback server would associate the ringback media with the callee and the caller. However, the ringback media is stored in the ringback server, and is streamed to the caller in-band over a bearer channel, typically a PSTN bearer channel.

The advent of high speed networks and powerful client devices has the potential to change the landscape of personalized ringback. Modern client devices that support VoIP typically have always-on data connections upon which these devices can conduct VoIP calls, and also receive ringback files. These devices may also be provisioned with gigabytes of storage, significant processing power, and high-quality speakers. Thus, it is possible for a high-quality audio file to be delivered out-of-band (e.g., not on a bearer channel) to a communication device for playout as ringback.

A system allowing callers to download and assign high-quality ringback tones to specific callees (and thus overriding a ringback tone selected by the callee and played out by the network) is disclosed in U.S. Patent Application Pub. No. 2007/0121657. However, this system performs in a fashion that is contrary to the expectation of subscribers, as it allows a caller, rather than a callee, to select ringback media for the caller/callee pair.

The following methods and systems facilitate the distribution of high-quality ringback files in a way that is harmonious with user expectation of personalized ringback behavior. In an exemplary embodiment, a first communication device and a second communication device are communicatively linked by a communication infrastructure. The communication infrastructure preferably includes a ringback file server that stores ringback files. The first communication device, or a user of the first communication device, may transmit an association request to the ringback file server, requesting that the ringback file is played out to the second communication device when the second communication device calls the first communication device. The ringback file may be an audio, video, or multimedia file.

The ringback file server may then maintain this association. But further, the ringback file server also transmits a copy of the ringback file and an indication of the association request to the second communication device, so that the second communication device can play out the ringback file when the second communication device calls the first communication device. Preferably, the communication infrastructure is made aware of the association, and forgoes transmitting an in-band default ringback tone to the second communication device during call setup.

In a further embodiment, a third communication device is also communicatively linked to the second communication device by the communication infrastructure. The third communication device may transmit an association request to the ringback file server, which may be interpreted as the third communication device requesting that the ringback file is played out to the second communication device when the second communication device calls the third communication device. The ringback file server may then maintain this association. Preferably, the ringback file server, instead of unnecessarily transmitting a second copy of the ringback file to the second communication device, transmits an indication of the association request to the second communication device. Accordingly, network capacity is conserved. Furthermore, the second communication device can play out the ringback file when the second communication device calls the third communication device.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

DESCRIPTION

Disclosed herein are methods and systems for distribution of ringback files via a communication infrastructure. Preferably, a callee device or a user of the callee device specifies a ringback file that it seeks to have played out to a given caller device as ringback media. Accordingly, a ringback file server responsively transmits a copy of the ringback file to the caller device, and the caller device plays out this file locally upon subsequent initiation of a call to the callee device.

I. NETWORK ARCHITECTURE

Figure 1:
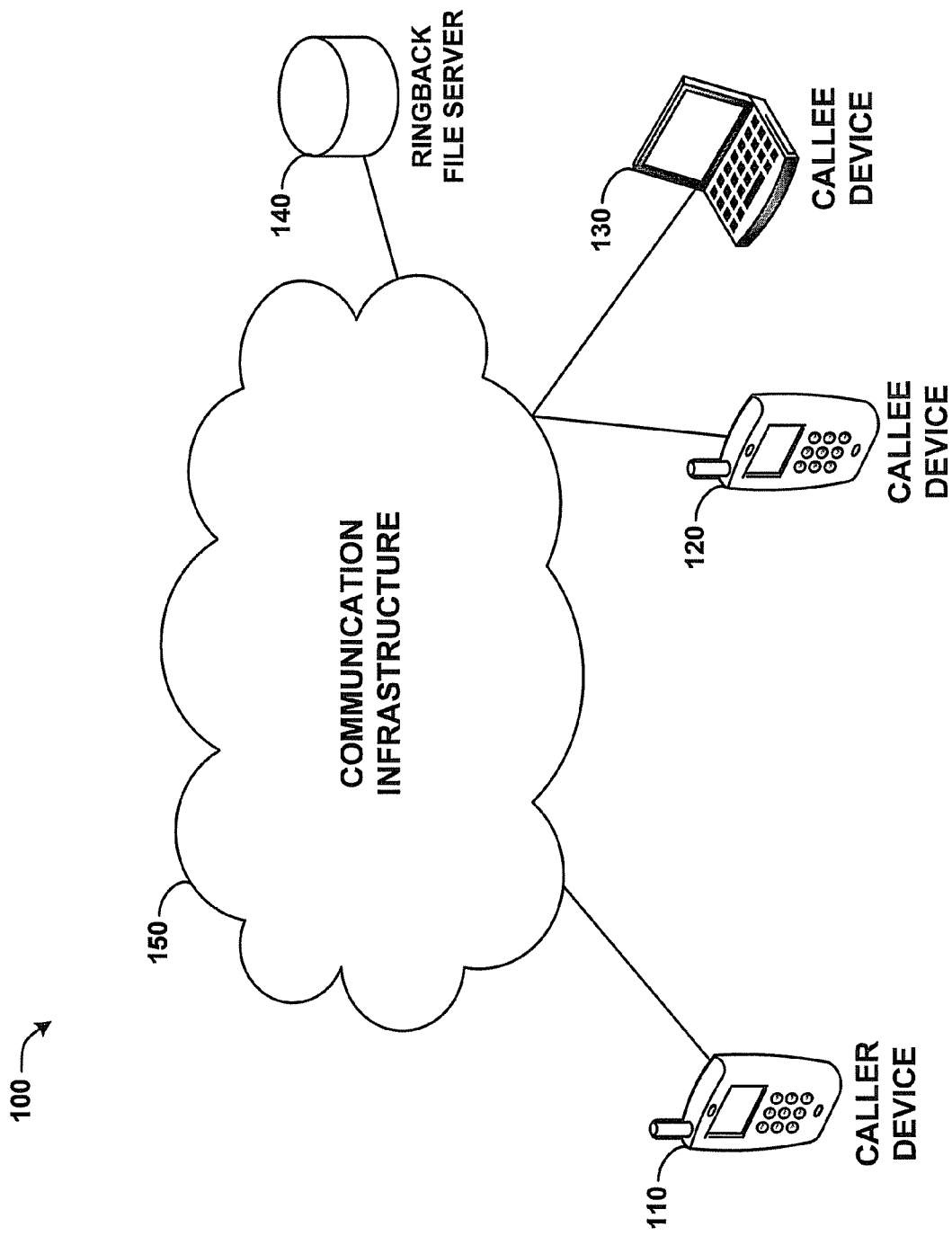
FIG. 1 depicts a communication system in accordance with a preferred embodiment.

FIG. 1 is a simplified block diagram of an exemplary system 100 for distribution of ringback files. Exemplary system 100 includes caller device 110, callee device 120, and callee device 130. These three devices are preferably wireline or wireless communication devices. Despite their designations as "caller" or "callee" in FIG. 1, it should be understood that each of these devices may be capable of both initiating and receiving calls over communication infrastructure 150, and that these designations are for purposes of simplicity and to connote the caller and callee in the discussion that follows.

Communication infrastructure 150 preferably links caller device 110, callee device 120, and callee device 130 so that these devices can communicate with one another. Furthermore, communication infrastructure 150 preferably contains ringback file server 140. However other arrangements are possible.

As such, exemplary system 100 may include more or fewer devices than shown in FIG. 1. These devices, including caller device 110, callee device 120, callee device 130, and ringback file server 140 may contain at least one central processing unit, memory, input/output peripherals, and a wireline or wireless network interface. The characteristics and functions of each of these elements are described at a high level in the following subsections. However, the descriptions in these subsections are merely introductory and should not be interpreted to limit the characteristics and functions of these devices.

Accordingly, it should be understood that this and other arrangements and processes described herein are set forth for purposes of example only, and other arrangements and elements (e.g., machines, interfaces, functions, orders of elements, etc.) can be added or used instead and some elements may be omitted altogether. Further, as in most communication architectures, those skilled in the art will appreciate that many of the elements described herein are functional entities that may be implemented as discrete components or in conjunction with other components, in any suitable combination or location.

a. Communication Devices

Caller device 110, callee device 120, and callee device 130 could be wireline telephones, wireless telephones, personal computers, servers, personal digital assistants, or another type of wired or wireless device. Preferably, these communication devices are subscriber devices, and are manipulated by a human in order to establish voice, video, and multimedia calls with one another and with other devices. However these devices could also be automated devices without a human interface.

Caller device 110, callee device 120, and callee device 130 preferably execute at least one communication application, such as a VoIP application or a PSTN application. Caller device 110 may further contain memory to store one or more ringback files, and processing logic to play out these ringback files when initiating a call, such as a VoIP call, with callee device 120 or callee device 130.

The ringback files stored on caller device 110 may conform to various types of standard or proprietary audio, video, or multimedia formats, including Motion Pictures Experts Group (MPEG®) Audio Layer 3 (MP3®), Free Lossless Audio Codec (FLAC®), Advanced Audio Coding (AAC®), Waveform Audio Format (WAV®), Windows Media Audio (WMA®), Ogg Vorbis, Real Audio®, Audio Video Interleave (AVI®), and so on. Furthermore, caller device 110 may also comprise a speaker and/or a video screen to facilitate playout of these ringback files during call setup or at other times.

Callee device 120 and callee device 130 may include program logic with which a user can select the ringback file, associate it with caller device 110, and communicate this selection to ringback file server 140. This program logic may take the form of, for example, a web browser, an email program, a short message service (SMS) or an instant messaging application on callee device 120 and callee device 130.

For example, a user of callee device 120 or callee device 130 could potentially utilize a web browser on the callee device to access a web interface on ringback file server 140. Via this web interface, the user could specify a ringback file, or a similar type of ringback media, to associate with caller device 110. Alternatively, such a ringback file specification could be made through an email, SMS, or instant message sent from callee device 120 or callee device 130 to ringback file server 140.

The exact means through which a ringback file is selected is preferably independent of the format of the ringback file. An exemplary type of ringback file may be a music file, for instance in the MP3® format.

b. Communication Infrastructure

Communication infrastructure 150 is preferably one or more networks that support access from wireline devices, wireless devices, or both. As such, communication infrastructure 150 may contain various types of routers, switches, gateways, firewalls, and servers. These elements, as well as caller device 110, callee device 120, callee device 130, may be coupled by wireline communication link technologies such as Ethernet, Token Ring, Synchronous Optical Networking (SONET), Asynchronous Transfer Mode (ATM), digital subscriber line (DSL), broadband cable television, or one or more of the various T-carrier systems. However, these elements may also, or alternatively, be coupled by wireless technologies, such as 802.11 (Wifi), BLUETOOTH®, code division multiple access (CDMA), Global System for Mobile communications (GSM), the $3^{rd}$ Generation Partnership Program (3GPP) Long Term Evolution (LTE), or Worldwide Interoperability for Microwave Access (WIMAX).

Communication infrastructure 150 may also contain devices that enable traditional circuit-switched voice telephony, VoIP, push to talk (PTT), multimedia calling and conferencing, audio or video streaming, gaming, or other audio, video, or multimedia applications. In order to facilitate a range of services, communication infrastructure 150 may comprise multiple physical and/or logical components associated with multimedia services. For example, communication infrastructure 150 may include one or more of the following: call session control function (CSCF), signaling gateway (SGW), media gateway control function (MGCF), media gateway (MGW), home subscriber server (HSS), as well as various application servers and/or downloadable application logic. Furthermore, communication infrastructure 150 may include one or more connections to the public Internet and/or private IP networks, or may itself be distributed across various physical or topological locations on the public Internet and/or private IP networks.

c. Ringback File Server

Ringback file server 140 may be a standalone or integrated device, and may be coupled to communication infrastructure 150, as shown in FIG. 1. Alternatively, ringback file server 140 may be part of communication infrastructure 150. Ringback file server 140 may be a personal computer, a standalone server, a blade server, a database, or another type of device, preferably with a large amount of memory in order to store ringback files. Ringback file server 140 may take the form of a single physical device, or may be divided into multiple logical components spanning a number of physical devices. Moreover, memory within ringback file server 140 may comprise semiconductor memory, magnetic memory, optical memory, acoustic memory, biological memory, or any combination of these memory technologies, or any other memory technology used in conjunction with computational devices.

Preferably, ringback file server 140 is capable of receiving requests to associate one or more ringback files with a tuple of a caller device and a callee device. For instance, ringback file server 140 may receive a request to associate a ringback file with the caller/callee tuple of caller device 110 and callee device 120. This association is preferably interpreted to mean that callee device 120, or a user of callee device 120, is requesting that the ringback file is played out during call setup when caller device 110 initiates a call to callee device 120.

The means through which such a request is delivered to ringback file server 140 may vary. The delivery mechanism may be a standard protocol, such the Hypertext Transfer Protocol (HTTP), Hypertext Transfer Protocol over Secure Sockets Layer (HTTPS), email, instant messaging, a variation of such a standard protocol, or a proprietary protocol. Furthermore, a non-IP protocol, such as SMS, may also be used.

In order to support the specification of association requests, ringback file server 140 may include, for example, a web interface that allows a user to log on to ringback file server 140 and to request the association between the ringback file, the caller device and the callee device. In response to receiving an association request, ringback file server 140 may determine that the ringback file specified in the association request should be transmitted to caller device 110. Alternatively, ringback file server may determine that it has already transmitted the ringback file to caller device 110. In this case, instead of transmitting the ringback file a second time to caller device 110, ringback file server 140 preferably transmits an indication of the association to caller device 110, thus conserving network capacity.

As described in the above discussion of caller device 110, ringback files may be of any format. For example, ringback files stored on ringback file server 140 may be of MP3®, FLAC®, AAC®, WAV®, WMA®, Ogg Vorbis, Real Audio®, AVI® formats or any other standard or proprietary audio, video, or multimedia file format. These files may be provisioned on ringback file server 140 by the operator of ringback file server 140, the operator of communication infrastructure 150, or by a third party. Furthermore, ringback file server 140 may allow callee devices to upload and provision their own ringback files.

II. EXEMPLARY OPERATION

The following embodiments involve a caller device, such as caller device 110, receiving a ringback file. The caller device preferably plays out this ringback file when it initiates a call to a callee device, such as callee device 120 or callee device 130, over a communication infrastructure, such as communication infrastructure 150. However, other network elements can be used without departing from the scope of these embodiments. Furthermore, these embodiments depict respective sequences of steps occurring between communication devices and the communication infrastructure, but each respective sequence of steps may occur in a different order, and fewer or more steps may be used without departing from the scope of the embodiments.

Figure 2:
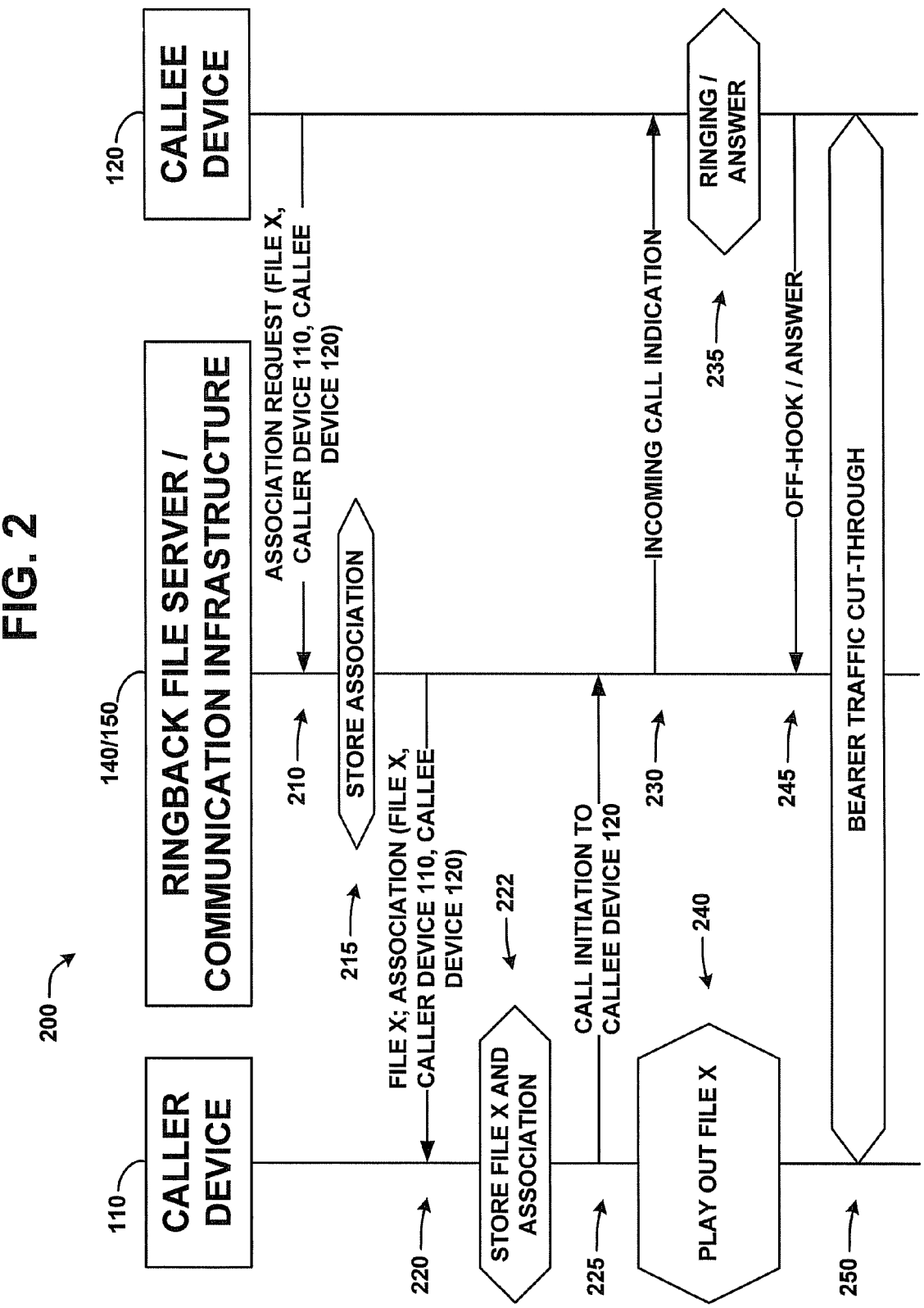
FIG. 2 depicts a call flow in accordance with a preferred embodiment.

In FIG. 2, call flow 200 involves caller device 110, callee device 120, ringback file server 140, and communication infrastructure 150. For purposes of convenience, ringback file server 140 and communication infrastructure 150 are shown as a single entity.

At step 210, callee device 120 transmits an association request to ringback file server 140, indicating that file X should be associated with the caller/callee tuple of caller device 110 and callee device 120. Alternatively, the association request may come from another device, but the association request is preferably initiated by a party that uses callee device 120. The association request preferably indicates that a callee device 120, or user of callee device 120, seeks to have the ringback file played out as ringback media when caller device 110 subsequently initiates a call to callee device 120.

At step 215, ringback file server 140 stores a representation of the association request, and preferably maintains this representation. At step 220, in response to receiving the association request, ringback file server 140 transmits a copy of file X and an indication of the association between file X, caller device 110, and callee device 120, to caller device 110. At step 222, caller device 110 stores file X and a representation of the association. Preferably file X is a high-quality audio, video or multimedia file. For example, file X may be an MP3® audio file encoding 30 seconds of music at 256 Kbps. However, file X may be of other formats, durations and bitrates.

The process of caller device 110 receiving and storing file X and the representation of the association may occur transparently to a user of caller device 110, or may occur with the user's knowledge, or with the user's explicit or implicit permission. Furthermore, caller device 110 may present its user with the option of accepting or rejecting storage of file X.

At step 225, caller device 110 initiates a call to callee device 120 via communication infrastructure 150. This call initiation may take many forms, including, but not limited to, the use of VoIP call establishment protocols such as the Session Initiation Protocol (SIP), the Real Time Streaming Protocol (RTSP), or H.323, and may involve one or more steps not shown in FIG. 2. On the other hand, the call initiation may use PSTN call establishment protocols, including Signaling System Number 7 (SS7), which may also involve one or more steps not shown in FIG. 2.

At step 230, communication infrastructure 150 transmits an incoming call indication to callee device 120. Accordingly, at step 235, callee device 120 rings, or otherwise indicates presence of the incoming call from caller device 110. Aside from an audible "ring" the indication may take the form of vibration, a visual alert, or another means to notify a human or non-human entity associated with callee device 120 to the presence of the incoming call.

During call setup between caller device 110 and callee device 120, caller device 110, at step 240, plays out stored file X. For example, caller device may play out file X through a speaker comprised within caller device 110 or via an external headset. Preferably, caller device plays out file X for a defined call setup period, for example, from the time from when caller device 110 initiates a call to caller device 120 to the time when caller device 110 receives an indication that an entity associated with callee device 120 has answered the call. Caller device 110 may begin playing out file X after receiving a "ringing" indication from communication infrastructure 150. Alternatively, caller device 110 may begin playing out file X without first receiving an indication.

During this call setup process, ringback file server 140 or communication infrastructure 150 may transmit in-band ringback media for caller device 110 to play out. Alternatively, one or both of these elements may determine that caller device 110 has already been provisioned with file X and that the association between caller device 110, callee device 120, and file X already exists, and therefore forgo transmitting in-band ringback media. Such a determination may be made, for example, based on receiving an indication from caller device 110 during call setup that caller device 110 has the capability to play out a local ringback file in place of playing out in-band ringback media. On the other hand, in-band ringback media may still be transmitted to caller device 110 by ringback file server 140 or communication infrastructure 150. However, caller device 110 may determine that, since it has been provisioned with file X, it should discard this in-band ringback in favor of playing out file X.

At step 245, callee device 120 may transmit an indication to communication infrastructure 150 that an entity associated with callee device 120 has gone "off-hook" or has otherwise answered the call. Alternatively, callee device 120 or communication infrastructure 150 may direct another device or network element, such as a voicemail server, to answer the call instead of callee device 120. In this case, the indication may be transmitted by a device other than callee device 120.

At step 250, bearer traffic between callee device 120 and caller device 110 is cut through (e.g., a bearer path for voice is established between callee device 120 and caller device 110). In FIG. 2, this bearer traffic cut-through serves to notify caller device 110 that an entity associated with callee device 120 has answered the call. In particular, by receiving bearer traffic on the appropriate bearer channel, caller device 110 is effectively notified that the call has been answered. However, communication infrastructure 150 may transmit a separate message to caller device 110 to serve the same purpose. Preferably, caller device 110 stops playing out file X upon bearer traffic being cut through or upon receiving a message indicating that callee device 120 has answered the call. Furthermore, the bearer traffic flow at step 250 may be unidirectional, such as from callee device 120 to caller device 110 or from caller device 110 to callee device 120, or bidirectional between caller device 110 and callee device 120.

In general, once caller device 110 has received file X and stored file X, caller device 110 can play out file X during any subsequent call to callee device 110 without requiring that ringback file server 140 once again transmit file X to caller device 110. Preferably, the associations maintained at ringback file server 140 and caller device 110 are preserved until they are deactivated or obviated by a new association request involving caller device 110 and callee device 120.

Figure 3:
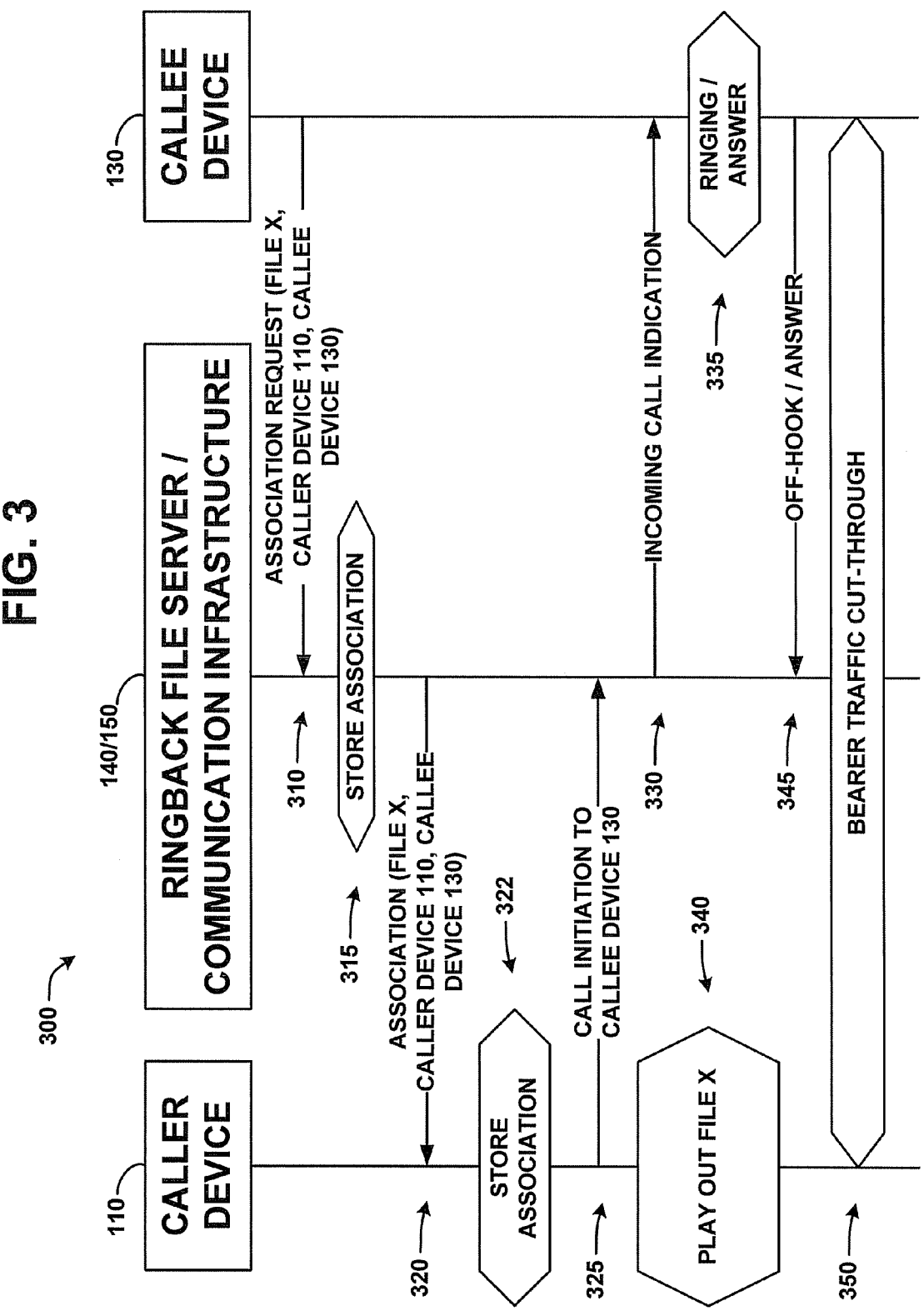
FIG. 3 depicts another call flow in accordance with a preferred embodiment.

Another callee device, such as callee device 130, may subsequently transmit an association request indicating that callee device 130, or a user of callee device 130, also seeks to have the same ringback file (file X) played out as ringback media when caller device 110 initiates a call to the callee device 130. Ringback file server 140 may be configured to transmit a ringback file to a caller device in response to receiving and association request. However, in this case, caller device 110 already is storing file X. Thus, ringback file server 140 can avoid transmitting file X to caller device 110 for a second time. FIG. 3 depicts such a scenario. Many of the steps depicted in FIG. 3 are the same or similar to those depicted in FIG. 2, with at least the exception that ringback file server 140 forgoes transmitting file X to caller device 110.

In FIG. 3, call flow 300 involves caller device 110, callee device 130, ringback file server 140, and communication infrastructure 150. Similar to FIG. 2, ringback file server 140 and communication infrastructure 150 are shown as a single entity for purposes of convenience. At step 310, callee device 130 transmits an association request to ringback file server 140, indicating that file X should be associated with the caller/callee tuple of caller device 110 and callee device 130. Alternatively, the association request may come from another device, but the association request is preferably initiated by a party that uses callee device 130. At step 315, ringback file server 140 stores a representation of the association, and preferably maintains the representation of the association.

At step 320, ringback file server 140 transmits an indication of the association between file X, caller device 110 and callee device 130, to caller device 110. At step 322, caller device 110 stores a representation this association, then at step 325, caller device 110 initiates a call to callee device 130 via communication infrastructure 150. Similar to the call initiation depicted in FIG. 2, this call initiation may use one or more protocols such as SIP, RTSP, or H.323, and may involve one or more steps not shown in FIG. 3.

At step 330, communication infrastructure 150 transmits an incoming call indication to callee device 130, and at step 335, callee device 130 rings or otherwise indicates presence of the incoming call from caller device 110. At step 340, during call setup between caller device 110 and callee device 130, caller device 110 plays out stored file X. At step 345, callee device 130 transmits an indication to communication infrastructure 150 that an entity associated with callee device 130 has gone "off-hook" or has otherwise answered the call. At step 350, bearer traffic between callee device 130 and caller device 110 is cut through. In this way, caller device 110 is able to play out the same stored file as ringback when calling either callee device 120 or callee device 130.

The following flow charts depict methods in accordance with preferred embodiments. These methods are represented by respective sequences of steps or events. However, these steps or events may occur in a different order, and fewer or more steps or events may occur without departing from the scope of the embodiments. Moreover, the methods depicted in these flow charts may be combined with one another wholly or in part, to form additional embodiments that are also within the scope of this invention.

Figure 4:
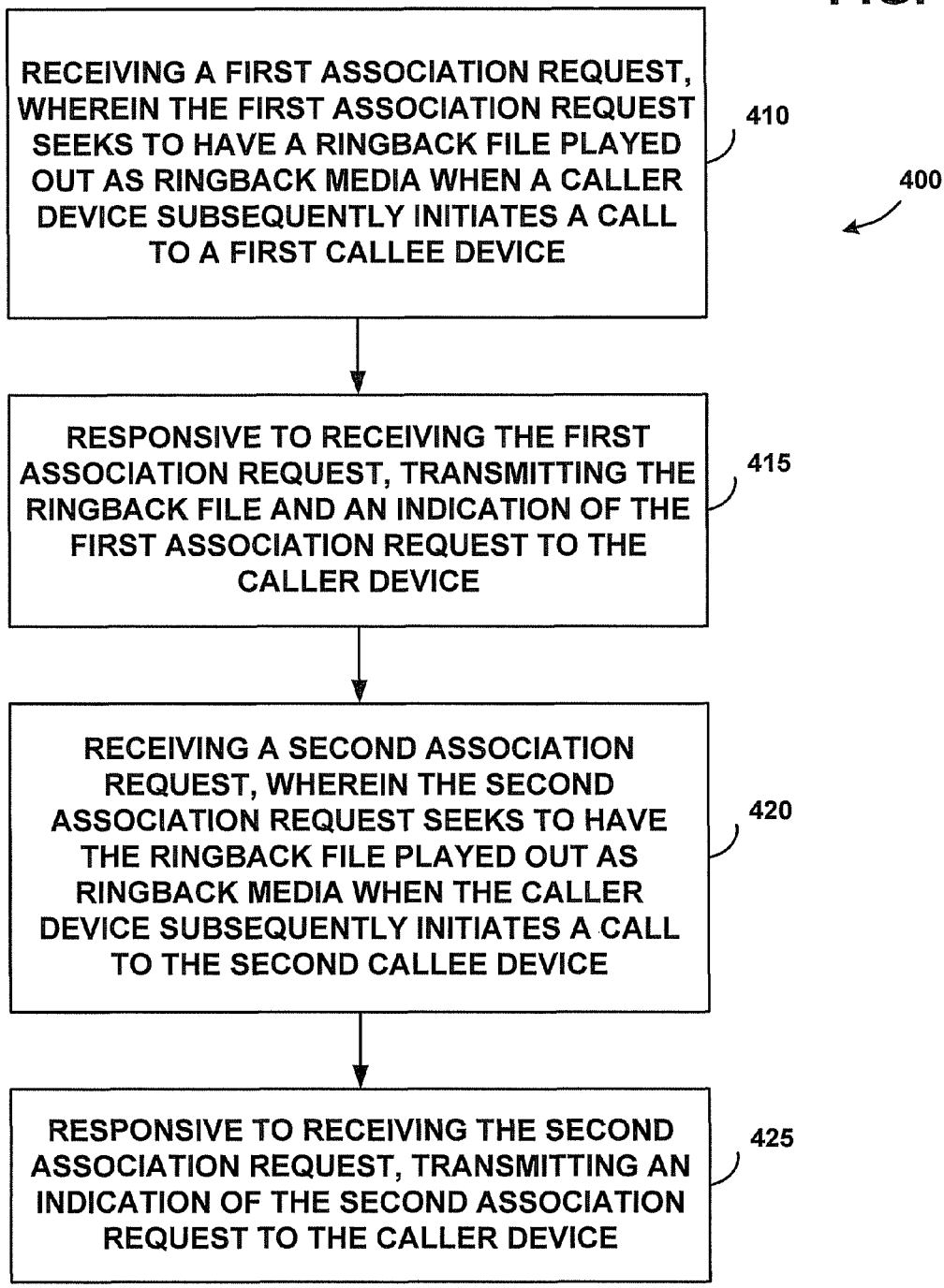
FIG. 4 depicts a flow chart of a method in accordance with a preferred embodiment.

FIG. 4 depicts a flow chart of method 400, where method 400 preferably takes place at a ringback file server. At step 410, a first association request is received from either a first callee device or a user of the first callee device. This first association request seeks to have a ringback file played out as ringback media when a caller device subsequently initiates a call to the first callee device. At step 415, responsive to receiving the first association request, the ringback file and an indication of the first association request are transmitted to the caller device. In this way, the caller device is provisioned with the ringback file for local playout, as well as information on when to play out the ringback file, as specified by the first association request.

At step 420, a second association request is received from a second callee device or a user of the second callee device. This second association request seeks to have the same ringback file played out as ringback media when the same caller device subsequently initiates a call to the second callee device. Accordingly, at step 425, responsive to receiving the second association request, an indication of the second association request is transmitted to the caller device. Thus, the caller device is provisioned with the second association, but does not receive or store a second copy the ringback file.

Figure 5:
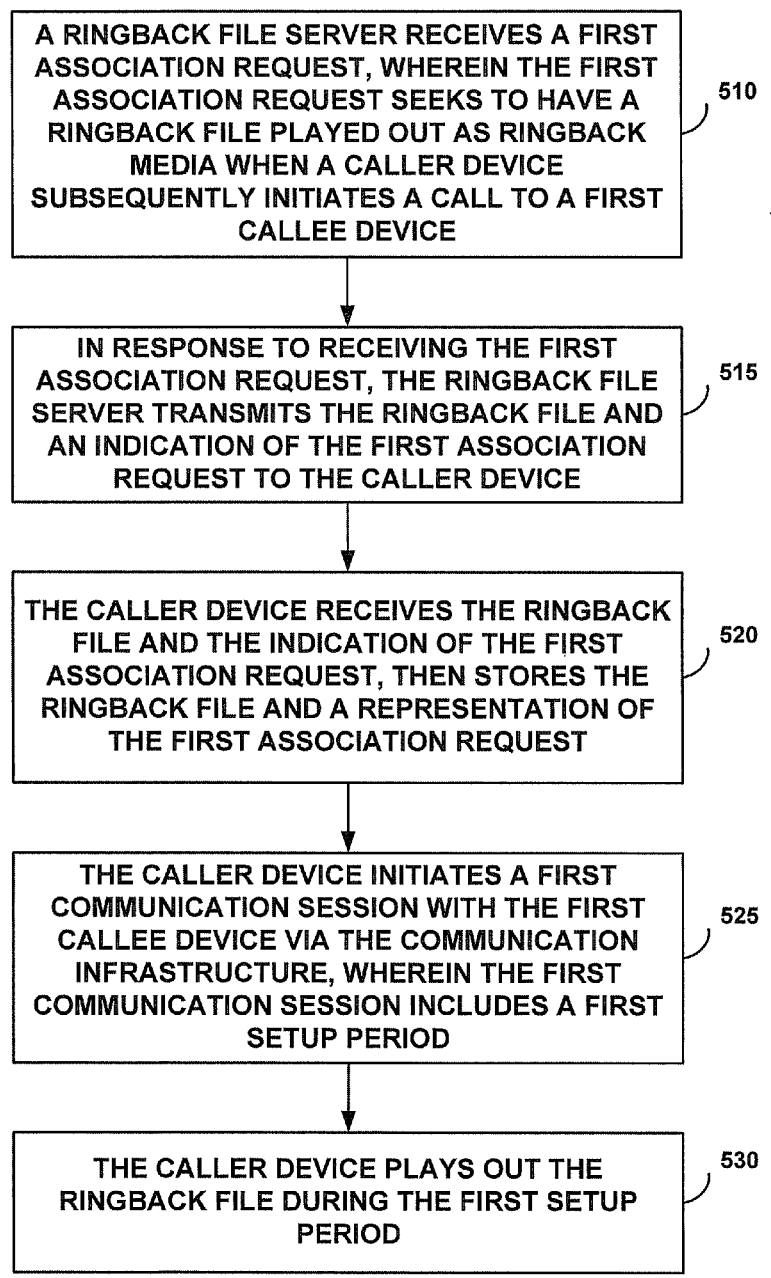
FIG. 5 depicts another flow chart of a method in accordance with a preferred embodiment.

FIG. 5 depicts a flow chart of method 500, where method 500 is similar to method 400 but is represented from the perspective of more devices. At step 510, a ringback file server receives a first association request from a first callee device or a user of the first callee device, wherein the first association request seeks to have a ringback file played out as ringback media when a caller device subsequently initiates a call to the first callee device. At step 515, in response to receiving the first association request, the ringback file server transmits the ringback file and an indication of the first association request to the caller device, and at step 520, the caller device receives the ringback file and the indication of the first association request, and then stores the ringback file and a representation of the first association request.

At step 525, the caller device initiates a first communication session with the first callee device via the communication infrastructure. Preferably, the first communication session includes a first setup period, which may comprise the time from when the callee device is notified of the incoming call to the time when the call is answered. At step 530, the caller device plays out the ringback file during this first setup period.

Figure 6:
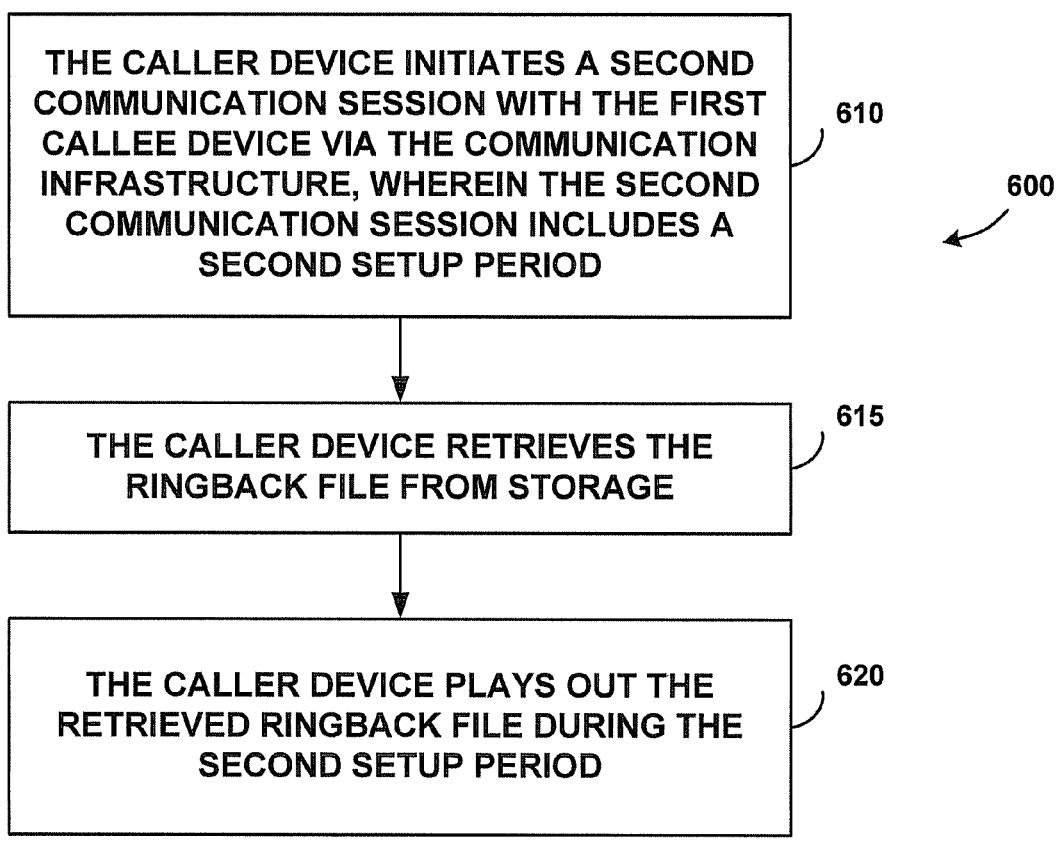
FIG. 6 depicts yet another flow chart of a method in accordance with a preferred embodiment.

FIG. 6 depicts a method 600 that preferably occurs subsequently to method 500. At step 610, the caller device initiates a second communication session with the first callee device via the communication infrastructure. This second communication session includes a second setup period. Rather than the ringback file server transmitting the ringback file to the caller device for a second time, the caller device, at step 615, retrieves the stored copy of the ringback file from storage. Furthermore, at step 620, the caller device plays out the retrieved ringback file during the second setup period.

Figure 7:
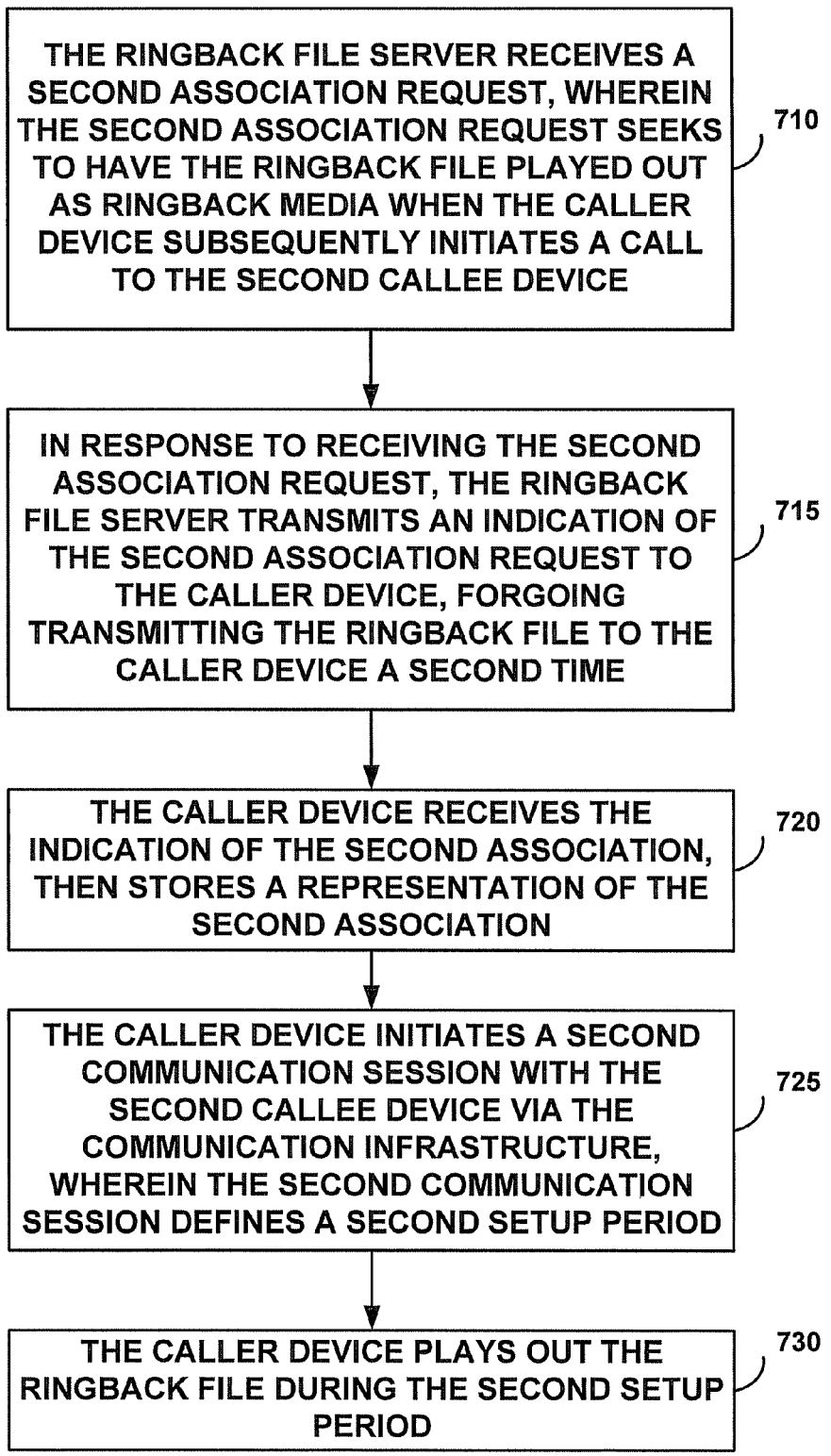
FIG. 7 depicts an additional flow chart of a method in accordance with a preferred embodiment.

FIG. 7 depicts a method 700 that preferably also occurs subsequently to method 500. At step 710, the ringback file server receives a second association request from a second callee device or a user of the second callee device, wherein the second association request seeks to have a ringback file played out as ringback media when the caller device subsequently initiates a call to the second callee device. At step 715, in response to receiving the second association request, the ringback file server transmits an indication of the second association request to the caller device, forgoing transmitting the ringback file to the caller device for a second time. At step 720, the caller device receives the indication of the second association request and stores a representation of the second association request.

At step 725, the caller device initiates a second communication session with the second callee device. Preferably, the second communication session is conducted via the communication infrastructure and defines a second setup period. At step 730, the caller device plays out the ringback file during the second setup period.

III. RINGBACK FILE SERVER EMBODIMENT

Figure 8:
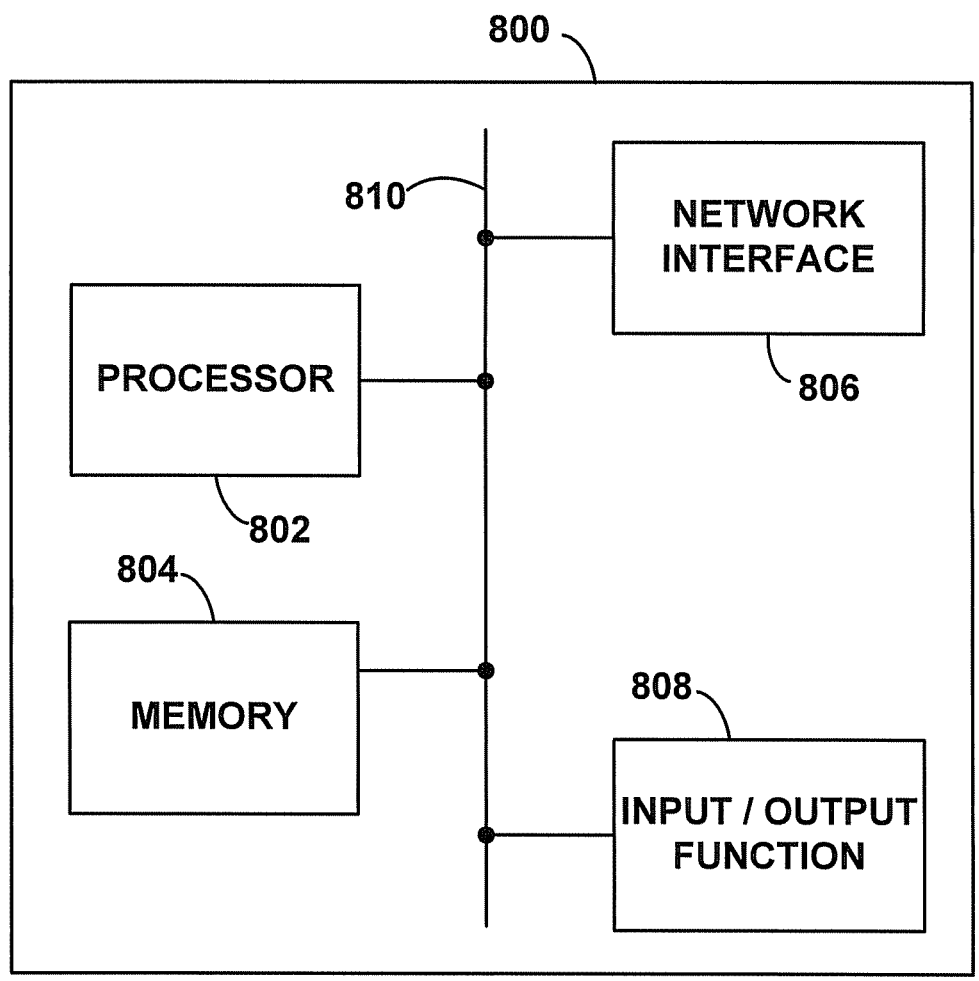
FIG. 8 depicts a block diagram of a ringback file server in accordance with a preferred embodiment.

FIG. 8 is a simplified block diagram exemplifying a ringback file server 800, and illustrating some of the functional components that would likely be found in a ringback file server arranged to operate in accordance with the embodiments herein. Example ringback file server 800 could be a device in communication infrastructure 150, or any other device that stores ringback files and maintains associations between ringback files, caller devices, and callee devices. However, example ringback file server 800 can take other forms as well.

Example ringback file server 800 preferably includes a processor 802, a memory 804, a network interface 806, and an input/output function 808, all of which may be coupled by a system bus 810 or a similar mechanism. Processor 802 preferably includes one or more CPUs, such as one or more general purpose processors and/or one or more dedicated processors (e.g., application specific integrated circuits (ASICs) or digital signal processors (DSPs), etc.) Memory 804, in turn, may comprise volatile and/or non-volatile memory and can be integrated in whole or in part with processor 802.

Memory 804 preferably holds program instructions executable by processor 802, and data that is manipulated by these instructions, to carry out various logic functions described herein. (Alternatively, the logic functions can be defined by hardware, firmware, and/or any combination of hardware, firmware and software.)

Network interface 806 may take the form of a wireline connection, such as an Ethernet, Token Ring, or T-carrier connection. Network interface 806 may also take the form of a wireless connection, such as IEEE 802.11 (Wifi), BLUETOOTH®, or a wide-area wireless connection. However, other forms of physical layer connections and other types of standard or proprietary communication protocols may be used over network interface 806. Furthermore, network interface 806 may comprise multiple physical interfaces.

Input/output function 808 facilitates user interaction with example ringback file server 800. Input/output function 808 may comprise multiple types of input devices, such as a keyboard, a mouse, a touch screen, and so on. Similarly, input/output function 808 may comprise multiple types of output devices, such as a monitor, printer, or one or more light emitting diodes (LEDs). Additionally or alternatively, example ringback file server 800 may support remote access from another device, via network interface 806 or via another interface (not shown), such an RS-232 port.

By way of example, the data in memory 804 may comprise one or more ringback files and one or more associations between these ringback files, caller devices, and callee devices. Furthermore, memory 804 may contain program instructions executable by processor 802 to receive a first association request from a first callee device or a user of the first callee device, wherein the first association request seeks to have a ringback file played out as ringback media when a caller device subsequently initiates a call to the first callee device. Memory 804 may also contain program instructions executable by processor 802 to respond to receiving the first association request by transmitting the ringback file and an indication of the first association request to the caller device, for storage of the ringback file and representation of the first association request at the caller device, and for playing of the ringback file during subsequent call initiation by the caller device to the first callee device.

Additionally, memory 804 may contain program instructions executable by processor 802 to provide a web interface, wherein the web interface allows the ringback file server to receive the first association request in the form of a web request. These web requests may reach ringback file server 800 via network interface 806, and ringback file server 800 may respond to these web requests via network interface 806.

Moreover, memory 804 may also contain program instructions executable by processor 802 to receive a second association request from a second callee device or a user of the second callee device, wherein the second association request seeks to have the ringback file played out as ringback media when the caller device subsequently initiates a call to the second callee device. Further, memory 804 may contain program instructions executable by processor 802 to respond to receiving the second association request by transmitting an indication of the second association request to the caller device, thereby enabling the caller device to play out the ringback file during subsequent call initiation by the caller device to the second callee device without the ringback file server transmitting the ringback file to the caller device a second time.

IV. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. A method comprising:
   a ringback file server receiving, from a first party, a first association request, wherein the first association request seeks to have a ringback file played out as ringback media by a caller device when the caller device subsequently initiates a call to a first callee device, wherein the first callee device is used by the first party; and
   responsive to receiving the first association request, the ringback file server transmitting the ringback file with the first association request to the caller device, wherein the first association request instructs the caller device to play the ringback file during subsequent call initiation by the caller device to the first callee device, wherein transmitting the ringback file with the first association request occurs before and independently of call initiation communication involving the caller device and the first callee device.

2. The method of claim 1, wherein the first association request comprises a request to maintain an association between the ringback file, the first callee device, and the caller device.

3. The method of claim 2, further comprising maintaining a representation of the association between the ringback file, the first callee device, and the caller device.

4. The method of claim 2, wherein a second callee device is used by a second party, the method further comprising:
   receiving, from the second party, a second association request, wherein the second association request seeks to have the ringback file played out as ringback media when the caller device subsequently initiates a call to the second callee device; and
   responsive to receiving the second association request, transmitting, to the caller device, the second association request, thereby enabling the caller device to play out the ringback file during subsequent call initiation by the caller device to the second callee device without the ringback file server transmitting the ringback file to the caller device a second time.

5. The method of claim 1, wherein the ringback file comprises an encoded audio signal.

6. The method of claim 1, wherein the ringback file comprises an encoded video signal.

7. The method of claim 1, wherein the ringback file server comprises a web server interface, and wherein the association request is received via the web server interface.

8. A method comprising:
   a ringback file server receiving a first association request from a first party, wherein the first association request seeks to have a ringback file played out as ringback media when a caller device subsequently initiates a call to a first callee device, wherein the first callee device is used by the first party;
   in response to receiving the first association request, the ringback file server transmitting the ringback file with the first association request to the caller device, wherein the first association request instructs the caller device to play the ringback file during subsequent call initiation by the caller device to the first callee device, and wherein transmitting the ringback file with the first association request occurs before and independently of call initiation communication involving the caller device and the first callee device;
   the caller device receiving the ringback file and the first association request;
   the caller device storing the ringback file and a representation of the first association request;
   subsequent to the caller device storing the ringback file and the representation of the first association request, the caller device initiating a first communication session with the first callee device via the communication infrastructure, wherein the first communication session defines a first setup period; and
   the caller device playing out the ringback file during the first setup period.

9. The method of claim 8, wherein the first association request comprises a request to maintain an association between the ringback file, the first callee device, and the caller device.

10. The method of claim 9, further comprising the ringback file server maintaining a representation of the association between the ringback file, the first callee device, and the caller device.

11. The method of claim 8, wherein the caller device storing the ringback file comprises the caller device associating the stored copy of the ringback file with the first callee device.

12. The method of claim 8, further comprising:
   the caller device initiating a second communication session with the first callee device via the communication infrastructure, wherein the second communication session defines a second setup period; and the caller device retrieving the ringback file from storage;

the caller device playing out the retrieved ringback file during the second setup period.

13. The method of claim 8, further comprising:

during the first setup period, the communication infrastructure determining that the caller device is capable of playing the ringback file; and the communication infrastructure responsively forgoing transmission of in-band ringback to the caller device.

14. The method of claim 13, wherein the communication infrastructure determining that the caller device is capable of playing the ringback file comprises the caller device indicating a capability to play the ringback file to the communication infrastructure.

15. The method of claim 8, wherein a second callee device is communicatively coupled to the communication infrastructure, and wherein the second callee device is used by a second party, the method further comprising:

the ringback file server receiving a second association request from the second party, wherein the second association request seeks to have the ringback file played out as ringback media when the caller device subsequently initiates a call to the second callee device;

in response to receiving the second association request, the ringback file server transmitting the second association request to the caller device, thereby forgoing the ringback file server transmitting the ringback file to the caller device a second time;

the caller device receiving the second association request and storing a representation of the association;

subsequent to the caller device storing the representation of the association, the caller device initiating a second communication session with the second callee device via the communication infrastructure, wherein the second communication session defines a second setup period; and the caller device playing out the ringback file during the second setup period.

16. The method of claim 8, wherein the ringback file comprises encoded audio.

17. The method of claim 8, wherein the ringback file comprises encoded video.

18. A ringback file server, comprising:

a processor;

a memory containing:

a ringback file;

program instructions executable by the processor to receive, from a first party, a first association request, wherein the first association request seeks to have the ringback file played out as ringback media when the caller device subsequently initiates a call to a first callee device, and wherein the first callee device is used by the first party; and program instructions executable by the processor to respond to receiving the first association request by transmitting the ringback file with the first association request to the caller device, wherein the first association request instructs the caller device to play the ringback file during subsequent call initiation by the caller device to the first callee device, wherein transmitting the ringback file with the first association request occurs before and independently of call initiation communication involving the caller device and the first callee device.

19. The ringback file server of claim 18, wherein the memory further contains:

program instructions executable by the processor to provide a web interface, wherein the web interface allows the ringback file server to receive the first association request in the form of a web request.

20. The ringback file server of claim 18, further comprising:

program instructions executable by the processor to receive, from a second party, a second association request, wherein the second association request seeks to have the ringback file played out as ringback media when the caller device subsequently initiates a call to a second callee device, and wherein the second callee device is used by the second party; and program instructions executable by the processor to respond to receiving the second association request by transmitting the second association request to the caller device, thereby enabling the caller device to play out the ringback file during subsequent call initiation by the caller device to the second callee device without the ringback file server transmitting the ringback file to the caller device a second time.

* * * * *